United States Patent
Valdmaa et al.

(10) Patent No.: US 10,301,448 B2
(45) Date of Patent: May 28, 2019

(54) POLYMER COMPOSITION FROM MIXED PLASTIC WASTE

(71) Applicant: Rolan Investment OÜ, Tallinn (EE)

(72) Inventors: Andrus Valdmaa, Ülenurme Parish (EE); Aivo Käsnar, Tartu (EE); Aarne Saareväli, Tallinn (EE)

(73) Assignee: Rolan Investment OU, Tallinn (EE)

( * ) Notice: Subject to any disclaimer, the term of this patent is extended or adjusted under 35 U.S.C. 154(b) by 0 days.

(21) Appl. No.: 15/237,647

(22) Filed: Aug. 16, 2016

(65) Prior Publication Data

US 2016/0355663 A1    Dec. 8, 2016

Related U.S. Application Data

(63) Continuation of application No. 14/299,310, filed on Jun. 9, 2014, now abandoned.

(30) Foreign Application Priority Data

Apr. 17, 2014 (EP) .................................. 14165118

(51) Int. Cl.
  C08J 11/06     (2006.01)
  C08L 23/06     (2006.01)
  B29B 17/00     (2006.01)

(52) U.S. Cl.
  CPC .......... *C08J 11/06* (2013.01); *B29B 17/0042* (2013.01); *C08L 23/06* (2013.01); *C08J 2300/30* (2013.01); *C08J 2323/06* (2013.01); *C08J 2323/12* (2013.01); *C08J 2423/10* (2013.01); *C08J 2425/04* (2013.01); *C08L 2205/02* (2013.01); *C08L 2205/03* (2013.01); *C08L 2205/035* (2013.01); *C08L 2207/20* (2013.01); *Y02W 30/62* (2015.05); *Y02W 30/701* (2015.05)

(58) Field of Classification Search
  CPC .... C08J 11/06; C08J 2300/30; C08J 2323/06; C08J 2323/12; C08J 2423/10; C08J 2425/04; C08L 2205/02; C08L 2205/03; C08L 2205/035; C08L 2207/20; C08L 23/06; Y02W 30/62; Y02W 30/701; B29B 17/0042
  See application file for complete search history.

(56) References Cited

U.S. PATENT DOCUMENTS

| | | | |
|---|---|---|---|
| 5,075,057 A * | 12/1991 | Hoedl | B29B 17/0026 264/115 |
| 2003/0078367 A1 * | 4/2003 | Khait | B29B 17/0404 528/480 |

* cited by examiner

*Primary Examiner* — Frances Tischler
(74) *Attorney, Agent, or Firm* — Berggren LLP

(57) ABSTRACT

A process for making polymer composition from mixed plastic waste is disclosed. The composition comprises plastic waste of different types obtained from recycled unidentified, uncleaned, unsorted, compacted and homogenized plastic waste. Preferably the plastic waste comprises polyethylene (PE), approximately 50-60% of its total volume; polypropylene (PP), approximately 20-30% of its total volume; polystyrene (PS), approximately 5-10% of its total volume; a mixture of unidentified plastic and other materials, approximately 1-10% of its total volume. The mixture of unidentified plastics comprises polyamides (PA), Polyethylene terephthalate (PET), Polyacetal (POM), and Polycarbonate (PC).

8 Claims, 6 Drawing Sheets

POLYMER COMPOSITION FROM MIXED PLASTIC WASTE

PRIORITY CLAIM

This application is a continuation application of U.S. non-provisional application Ser. No. 14/299,310 which was filed on Jun. 9, 2014 claiming priority of European application number EP 14165118, filed on Apr. 17, 2014 and the contents of both of are fully incorporated herein by reference.

FIELD OF THE INVENTION

The present solution belongs to the field of environment-friendly recovering of plastic waste, more specifically to the field of recycling unsorted mixed plastic waste into new materials.

BACKGROUND OF THE INVENTION

As the use of plastic products is very widespread, reuse of the plastic waste represents a huge challenge. Plastic packing (e.g. plastic bags, plastic packing of ham, cheese, yoghurt, and other food products and consumer goods, and other plastic packing, plastic dishes) and other plastic waste (box pallets, garden furniture, buckets, plastic sledges, car bumpers, canisters, pipes, bobbins, computer cases, TV sets, plastic refrigerator details, etc.) form the most problematic and continuously growing type of waste, that according to common solutions can today be mainly landfilled, incinerated or used as filling material. Such solutions pollute the environment, are costly, and at the same time waste material that could be used as raw material for new applications.

Initial sorting of waste and subsequent recycling of single-type plastics into uniform mass, granules or new products are the generally grown solutions for recycling plastic. Recycling is performed based on one specific type of plastic, e.g. LDPE, HDPE, or PET, in the course of which the sorted plastic waste is washed, broken up, dried and granulated. The plastic granules produced based on the recovered single-type polymer can be used by the plastics industry as raw material for manufacturing new products. As sorting plastic waste by their types is, however, very costly and time-consuming, difficult to sort mixed plastic waste is mostly not recycled, and due to that mixed plastic waste is channelled to incineration or landfilling.

As far as known, no suitable solution has been found for recycling polymers of different types. When comparing polymer materials to other materials like glass and metals, the polymers of a plastic need longer processes to enable their recovery. The biggest problem is posed by the fact that polymers of different types are immiscible with each other because of their different molecular weights and long polymer chains. Heating the polymers is not sufficient for decomposing polymer molecules; therefore, the polymers to be recovered must often have identical compositions to achieve effective mixing. When plastics of different types are simultaneously melted together, they usually do not mix—like oil and water—and will lie in layers.

Because of such problems the unsorted waste of mixed plastics remains unused by the plastics industry; also sorting plastic waste from households and other consumers by their types is very costly or almost impossible. Standard plastics industries manufacturing hundred millions tons of plastic products to be used, are configured to work with virgin, or initial single-type plastic granules (LDPE, HDPE, PS, PP, PET, AB, composites, (PS/PP, PP/PE, PS/PC), HIPS, EPS, PA, POM, PC, etc.), and their technological production solutions are not capable of handling mixed and contaminated plastic waste.

The scientific base known up to now does not support effective solutions for mixing different and recovered polymers; the opinion that this cannot be achieved has become dominant.

Experiments attempting to recycle mixed plastic waste of different types are known from the state of the art. Such solutions, however, also involve sorting and/or adding of other materials during the recycling process, to facilitate better binding of the mixture obtained by recycling. For example, a solution involving recycling of different waste into granules is known from the international patent application WO2012009005. Wastewater and several other types of waste are added to plastic waste according to this solution. The material obtained using this solution is not homogeneous. International patent application WO0238276 describes a process and device for recycling plastic household waste, but the solution requires preliminary cleaning and sorting of the plastics.

The process described in U.S. Pat. No. 6,274,637B1 for producing a material mixture from mixed plastics, plastic waste or other unidentified or known plastics, and manufacturing products from it by mixing, breaking up, thermal processing, and moulding/cooling can be considered the closest known solution from the state of the art. According to this solution, pre-sorted plastic materials, other substances, and additives (fatty acids are used) are mixed together. The mixture of all components is thermally processed in the course of up to twelve-stage and up to 400° C. heating cycle, and the outcoming mass is either cooled or conveyed to product manufacturing. This solution uses either an extruder or injection moulding machine device. The fraction size of the material produced by recycling is 0.1 to 5 mm. The solution provided describes recycling of plastic waste of different types, including plastic waste of small and large volume weights, together with other materials (metal, wood, sawdust, paper, rubber, fibres) or unknown materials. It is generally known that plastics of different types mix poorly or not at all, in case of this solution yet other poorly miscible materials are added in the course of recycling. The material mixture obtained as a result is of poor quality, unstable, of non-uniform composition and low weatherproofness. Multiple-stage heating at high temperatures makes the process complicated, costly and time-consuming. This solution assumes that the recycled material containing plastics has been previously sorted. In addition to that fatty acids must be added during recycling that in turn further complicates the process. Only one embodiment has been provided as an example: a product manufactured from cable waste, and a mixture of PVC, PE and rubber granules. No other process parameters aside from temperature ranges have been specified for the solution provided, including, e.g. pressure, time or other conditions to be monitored during the process.

Considering the properties of the materials listed for the solution provided, and the incomplete process specification, such solution is not practicable according to the opinion of a person skilled in the art.

The biggest shortcoming of the prior art solutions is producing an extremely unstable mass by mixing and melting different plastics, that cannot be managed by the currently known plastic processing process, let alone enable a stable raw material to be achieved and finished products to be manufactured from it.

SUMMARY OF THE INVENTION

A polymer composition from mixed plastic waste is disclosed where the composition comprises plastic waste of different types, wherein the polymer composition is obtained from recycled unidentified, uncleaned, unsorted, compacted and homogenized plastic waste of small volume weight, comprising: polyethylene (PE), approximately 50-60% of its total volume; polypropylene (PP), approximately 20-30% of its total volume; polystyrene (PS), approximately 5-10% of its total volume; and a mixture of unidentified plastic and other materials, approximately 1-10% of its total volume.

The polymer composition from mixed plastic waste of this invention has the following properties: Density of the material in agglomerated phase: 380-450 kg/m$^3$, Density of the material in melted and solidified phase: 950-1050 kg/m$^3$, Melt flow index (g/10 min.): 1-5; Melting temperature: 165-180° C.; Color: grey; Moisture content: below 1%; Fraction size: up to 10 mm; Tensile modulus (Elongation 50 mm/min): 642.76-854.28 MPa; Tensile stress at maximum load (Elongation 50 mm/min): 14.6-17.01 MPa; Flexural modulus (Bending rate 20 mm/min): 1126-1723 Mpa; Impact strength Charpy (Hammer 4 J): 1,938-3,544 kJ/m$^2$, and Heat deflection temperature: 80-82° C.

The polymer composition from mixed plastic waste of this invention may additionally comprise unidentified, uncleaned, unsorted, homogenized plastic waste of large volume weight so that the plastic waste content is: compacted and homogenized plastic waste of small volume weight, approximately 50-75% of the total volume, and homogenized plastic waste of large volume weight, approximately 25-50% of the total volume.

The polymer composition from mixed plastic waste of this invention may additionally comprise unidentified, uncleaned, unsorted homogenized plastic waste of large volume weight, an additional component X, and additives Y, and wherein the polymer composition comprises: recycled plastic waste of small volume weight, approximately 55-60% of the total volume; plastic waste of large volume weight, approximately 10-20% of the total volume, and additionally polystyrene (PS), approximately 10-20% and polypropylene (PP) approximately 10-20% of the total volume, and additives Y approximately 0.2-10%. The additional component X may be either a single-type polymer or mixture of single-type polymers. The additive Y may be a pigment, UV protective agent, antioxidant, foaming agent, mineral substance, glass fibre substance and/or textile fibre substance.

The objective of the present invention is to propose a stable and homogeneous material mixture, free from the shortcomings of the prior art, recycled from unsorted, unwashed and unidentified mixed plastic waste. More specifically, the objective of the invention is to propose a material mixture recycled from unsorted, unwashed, unidentified plastic waste with small and large volume weights.

The traditional polymer recycling process handles polymeric raw materials that are accurately identified and have very clear properties characteristic to polymers of a specific type. The polymer composition from mixed plastic waste of the present invention comprises mixtures of different polymer materials, including mixtures of not accurately identified recovered polymer materials, keeping the production process stable and simultaneously fulfilling the requirements established for end material being produced.

The polymer composition of the present solution can be used as raw material for manufacturing various plastic products, e.g. terrace tables, matchboards, furniture, fence modules, noise barrier systems, building and finishing materials, etc. Unlike known solutions, according to the present solution the polymer material waste is not separated by types, and distinguishing between plastic household waste of different colours is not necessary. This enables valuation of plastic waste several hundred times more highly than by their one-time incineration as waste fuel, landfilling, utilising as filling material or in some other way.

The advantage of the polymer composition of the present invention over other currently known solutions is the fact that plastic waste is recycled without involving a specific polymer sorting process, counterweighting the plastic products thrown on the market. The end products manufactured of the polymer composition recycled from unidentified mixed plastic waste according to the solution of the present invention are weatherproof, maintenance-free and fully recyclable again after decades of use, thus creating a new "endless" usage cycle for plastic waste. Profiles manufactured of the polymer composition of the present invention can be widely used and utilised as a basis for creating certified product groups like noise barriers, terrace systems and other building systems; when applying this process, wood resources are spared by adopting maintenance-free and more weatherproof products as an alternative.

In the conventional plastic waste recycling process the plastic waste is collected and sorted separately by specific polymer types. The present solution does not distinguish different polymer types for producing the polymer composition.

Plastics of small and large volume weights are separated in the course of collecting the waste to achieve the objective, after that non-plastics like glass, metal, textiles, paper, wood, aluminium, copper, sand, etc. are separated from both sets of plastics, and the mixed plastic waste is then recycled to a homogeneous polymer mixture by breaking up, compacting and granulating. Thereat plastic waste is not separated by polymer types.

Plastics of smaller volume weight (0.1-0.15 (up to 0.4) t/m$^3$) are, e.g. light volatile plastic packing created in households like plastic bags, plastic packing of ham, cheese, yoghurt and other food products or consumer goods, etc. This plastic packing forms the most problematic and continuously growing type of plastic waste that can today mainly be either landfilled or incinerated. Statistically this group of plastics of small volume weight averagely comprises: PE 50-60% of the total volume; PP 20-30% of the total volume; PS 5-10% of the total volume; other unidentified plastics (e.g. PA, PET, POM, PC, PET, composite plastics, etc.) 1-10% of the total volume.

Plastics of large volume weight (>0.4 t/m$^3$) are plastic waste of household or industrial origin, requiring utilisation. These are, e.g. discarded box pallets, garden furniture, buckets, plastic sledges, car bumpers, canisters, pipes, bobbins, computer cases, TV sets, plastic refrigerator details, etc. Statistically this group comprises, e.g.: PS; PP; PE (LDPE and HDPE); HIPS; ABS; PC; PS/PP (compounds); PP/HD (compounds); MIX plastics (a quantity of plastics where determining the type of plastic has not succeeded).

BRIEF DESCRIPTION OF THE DRAWINGS

The present invention is explained more precisely with references to figures added, where.

DETAILED DESCRIPTION OF THE INVENTION

The polymer composition of the present invention from mixed plastic waste comprises a homogeneous polymer mixture recycled from unsorted, unidentified, uncleaned plastic waste of different densities, various colours, small volume weight and/or large volume weight.

Figure 1:
FIG. 1 presents unidentified, uncleaned, unsorted mixed plastic waste of small volume weight.
Figure 2:
FIG. 2 presents the compacted and homogenized fraction of the polymer composition of the present invention according to the preferred embodiment, recycled from mixed plastic waste presented in FIG. 1.
Figure 3:
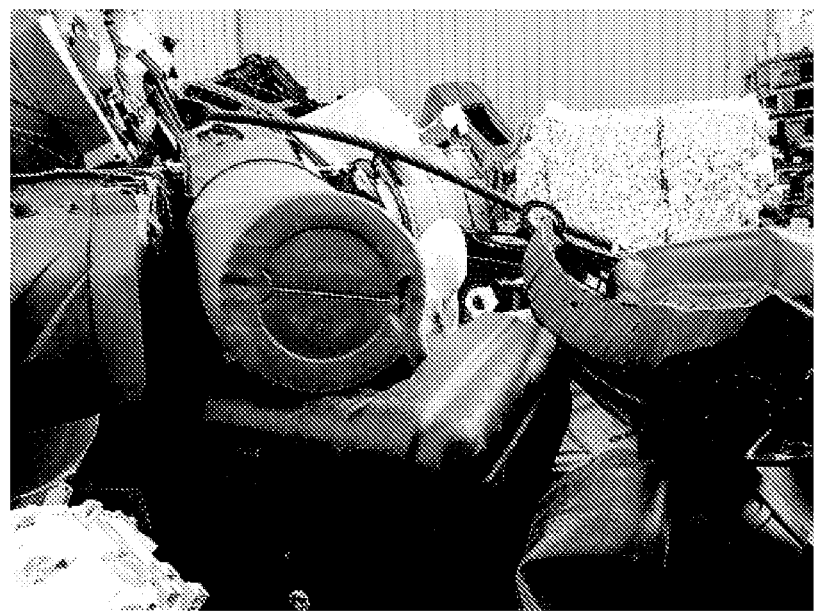
FIG. 3 presents unidentified, uncleaned, unsorted mixed plastic waste of large volume weight.

The polymer composition of the present invention presented in FIG. 2, from compacted and homogenized mixed plastic waste comprises plastic waste of different types, and according to the preferred embodiment the polymer composition is obtained from recycled unidentified, uncleaned, unsorted plastic waste of small volume weight, containing:
   polyethylene (PE), approximately 50-60% of its total volume;
   polypropylene (PP), approximately 20-30% of its total volume;
   polystyrene (PS), approximately 5-10% of its total volume;
   a mixture of unidentified plastic and other materials, approximately 1-10% of its total volume.

The properties of the polymer composition are as follows.
Density of the material in agglomerated phase: 380-450 kg/m$^3$
Density of the material in melted and solidified phase: 950-1050 kg/m$^3$
Melt flow index (g/10 min.): 1-5, preferably 2.5-3.5
Melting temperature: 165-180° C.
Color: grey
Moisture content: below 1%
Fraction size: up to 10 mm
Tensile modulus (Elongation 50 mm/min): 642.76-854.28 MPa
Tensile stress at maximum load (Elongation 50 mm/min): 14.6-17.01 MPa
Flexural modulus (Bending rate 20 mm/min): 1126-1723 MPa
Impact strength Charpy (Hammer 4 J): 1,938-3,544 kJ/m$^2$
Heat deflection temperature: 80-82° C.

The unidentified plastic material portion of the polymer composition comprises, e.g. polyamides (PA), Polyethylene terephthalate (PET), Polyacetal (POM), Polycarbonate (PC). According to an alternative embodiment of the polymer composition of the present invention from mixed plastic waste, the composition comprises unidentified, uncleaned, unsorted, homogenized plastic waste of large volume weight:
   polyethylene (PE), approximately 50-60% of its total volume;
   polypropylene (PP), approximately 20-30% of its total volume;
   PS, ABS, PC, HIPS, approximately 5-10% of its total volume;
   mixture of unidentified plastic and other materials (e.g. sand, soil, organics, etc.), approximately 1-10% of its total volume.

According to the alternative embodiment of the polymer composition of the present invention from mixed plastic waste, the composition additionally comprises recycled unidentified, uncleaned, unsorted, plastic household waste of large volume weight, whereas the recycled plastic waste of large volume weight comprises polypropylene (PP), HD polyethylene (HDPE), LD polyethylene (LDPE), polystyrene (PS), ABS, PET, PS/PP compounds, PP/HD compounds, other unidentified types of plastic material. The approximate plastic waste content of this polymer composition is as follows:
   recycled plastic waste of small volume weight, approximately 50-75% of the total volume, and
   plastic waste of large volume weight, approximately 25-50% of the total volume.

Figure 7:
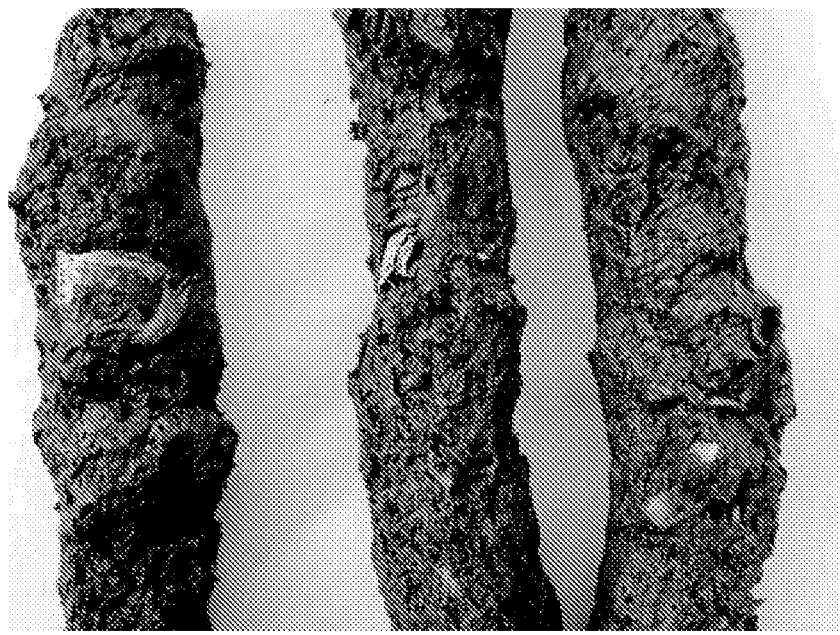
FIG. 7 presents the congealed molten mass (mixture A1) of the polymer composition of the present invention presented in FIG. 2.
Figure 8:
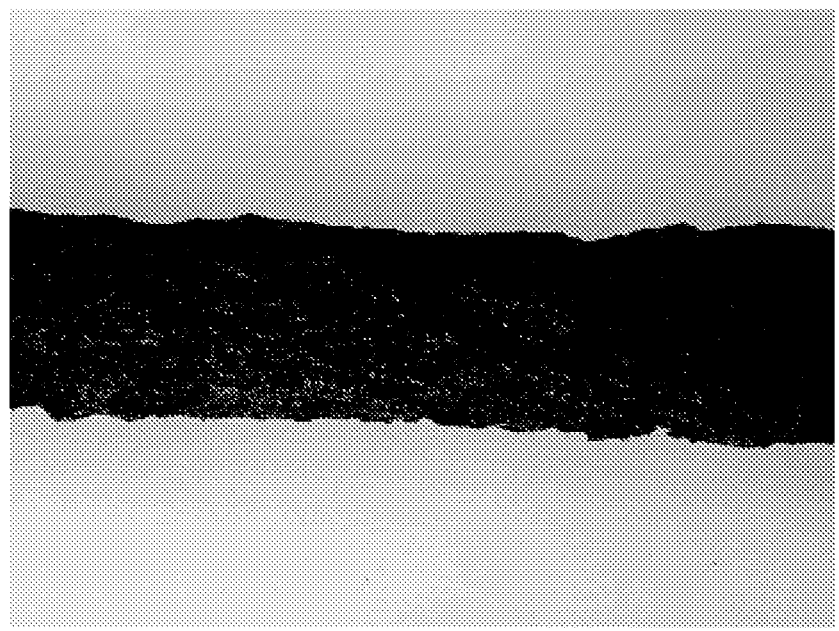
FIG. 8 presents the congealed molten mass (mixture A2) of the polymer composition of the present invention presented in FIG. 2.

The examples of such embodiment are presented in FIGS. 7 and 8, whereas larger PET content is evident in FIG. 7 in the form of unmelted pieces.

According to an alternative embodiment of the polymer composition of the present invention, the composition comprises a mixture of recycled unidentified, uncleaned, unsorted plastic household waste of small and large volume weights, with a component X and additives Y added to it, whereas the component X is preferably either a single-type polymer or a mixture of single-type polymers made up from polystyrene (PS) and polypropylene (PP), chosen from a sorted source, and having been added in such a ratio that the polymer composition obtained comprises:
   recycled plastic waste of small volume weight, approximately 50-75%, and preferably 55-60% of the total volume;
   recycled plastic waste of large volume weight, approximately 10-50%, and preferably 10-25% of the total volume, and additionally;
   polystyrene (PS), approximately 5-20% (preferably 5-15%) of the total volume, and polypropylene (PP) approximately 5-20% (preferably 5-15%) of the total volume, and
   additives Y approximately 0.2-10%, preferably 1-5%.

The properties of the polymer composition are as follows.
Density of the material: 979-1026 kg/m$^3$
Melt flow index (g/10 min.) approximately 2-5
Melting temperature: 165-180° C.
Tensile modulus (Elongation 50 mm/min): 794.97-864.70
Tensile stress at maximum load (Elongation 50 mm/min): 18.11-21.04 MPa Flexural modulus (Bending rate 20 mm/min):
Impact strength Charpy (Hammer 4 J): 1,348-1,938 kJ/m$^2$
Heat deflection temperature: 79-81° C.

As the additives Y, e.g. pigments in PE-carrier, UV protective agents, antioxidants, foaming agent, mineral and structure supplementing additives, glass fibre substances, textile fibre substances and/or mineral additives have been added.

To make plastic materials of different types mix with each other in the course of subsequent recycling of the composition of the present invention, the results of experiments have shown that the composition should comprise a sufficient quantity of polymers of similar properties and similar molecular formulas. According to the most preferable embodiment these are polystyrene and polypropylene, with the preferred content in the composition being 5-15%.

The composition is obtained from plastic waste of small volume weight has 70-90% of PE/PP, having a similar molecular formula. The molten mass of the plastics with similar molecular formulas will dominate when melted. The polymer composition is obtained from plastic waste of large volume weight also has 70-90% of PE/PP, having a similar molecular formula. The molten mass of the plastics with similar molecular formulas will dominate when melted.

Figure 4:
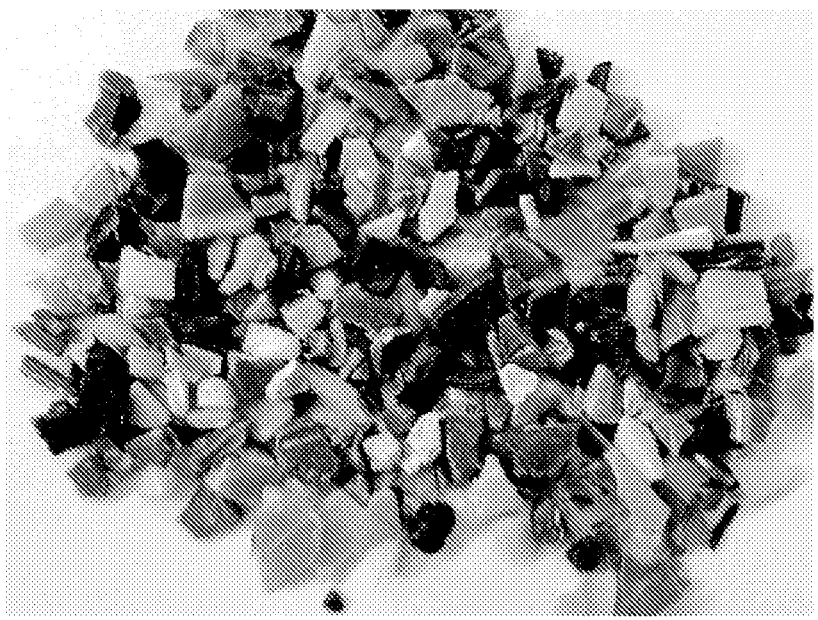
FIG. 4 presents the compacted and homogenized fraction of the polymer composition of the present invention according to an alternative embodiment, recycled from mixed plastic waste presented in FIG. 3.
Figure 5:
FIG. 5 presents the fraction of the polymer mixture composition of the present invention according to another alternative embodiment, recycled from mixed plastic waste presented in FIG. 2 and FIG. 4.

Due to that, when the mixture obtained from plastic waste of large volume weight (presented in FIG. 4) is additionally added to the composition obtained from plastic waste of small volume weight (presented in FIG. 2), then by melting such a polymer composition of the alternative embodiment of the present invention (presented in FIG. 5), the molten mass of the plastics with similar molecular formulas will dominate.

Components X and additives Y are additionally added as substances controlling the subsequent production process as appropriate, i.e. the behaviour of the molten plastic mass is controlled through them in the course of recycling the composition.

Experiments have shown the property of the polypropylene (PP) to move within the surface layers of the mass molten in the course of the recycling process of the mixed plastic waste composition, binding the previous mass of polymers of similar molecular formulas, obtained on the basis of plastic waste of small and large volume weights. The product surface is formed when coming into contact with the wall of the product cooling mould, non-permeable to gases.

Experiments have shown the property of polystyrene (PS) to move within the middle layers of the molten mass of the mixed plastic waste composition. As the cooling rate of polystyrene (PS) is higher than that of the rest of the mass of the mixed plastic waste composition, and polystyrene (PS) is located in the middle layers of the molten mass, cooling the product will create a product structure not allowing the product to collapse.

Sufficient mixing of polystyrene (PS) and the rest of the molten plastic mass in the molten state of the polymer composition of the present invention and under pressure, ensuring the homogeneity and durability of the product, preserves porous content for the product, and this in turn yields ca. 0.5-0.8 t/m$^3$ as the potential density of the product.

When, e.g. a foaming agent is added by manufacturing products from the polymer composition of the present invention, formation of gases in the molten plastic mass is stimulated, at the time of its cooling the gases start to expand, and seek a way out from the molten plastic mass. The volume weight of the end product can be changed by varying the dosages of the foaming agent. At the time of cooling the gases start to expand, and seek a way out from the molten plastic mass. Polypropylene moves within the surface layers of the molten mass during the process, binding the former mass of similar molecular formula with itself, and momentarily forming a layer non-permeable to gases, when coming into contact with the cold calibrator wall. Polystyrene moves within the middle layers of the molten mass. As the congealing rate of polystyrene (PS) is higher than that of the rest of the mass, and it is located in the middle layers of the molten mass, a structure not allowing the product being manufactured no longer to collapse, is created at the time of cooling. Sufficient mixing of polystyrene (PS) and the rest of the molten plastic mass in the molten state and under pressure takes place at the same time, ensuring the homogeneity, and preserving porous content for the product, that in turn yields ca. 0.5-0.8 t/m$^3$ as the density of the profile.

To improve the quality, polystyrene (PS) and/or polypropylene (PP) is additionally added to the polymer composition, obtained from the unidentified, uncleaned, and unsorted plastic household waste mixture of small and large volume weights of the present invention. For example, according to the embodiment presented in FIG. 7, polystyrene (PS) and polypropylene (PP) are additionally added to the mixture, approximately 12% of both.

A test specimen of very good quality, obtained with a test melting equipment can be seen in case of the embodiment presented in FIG. 8. The surface structure is uniform, with light gloss. This indicates the pureness and quality of mixture A. In case of such embodiment polystyrene (PS) and polypropylene (PP) are additionally added to the mixture, approximately 5% of both.

FIG. 2 presents the polymer composition of the present invention. Granulated plastic waste, obtained by recycling a single-type polymer could have a similar appearance. The differences between the polymer composition of the present invention, and a granulated single-type polymer are clearly evident when comparing their hardened molten masses.

Hardened molten masses of the preferred embodiment of the polymer composition of the present invention are presented in FIG. 7 and FIG. 8. Less uniform fusing due to the foreign matter (sand, organic matter, soil, dust, paper) present in the plastic mixture is clearly visible. Virtually no gloss is evident. The test specimen can be broken in half by hand.

Figure 9:
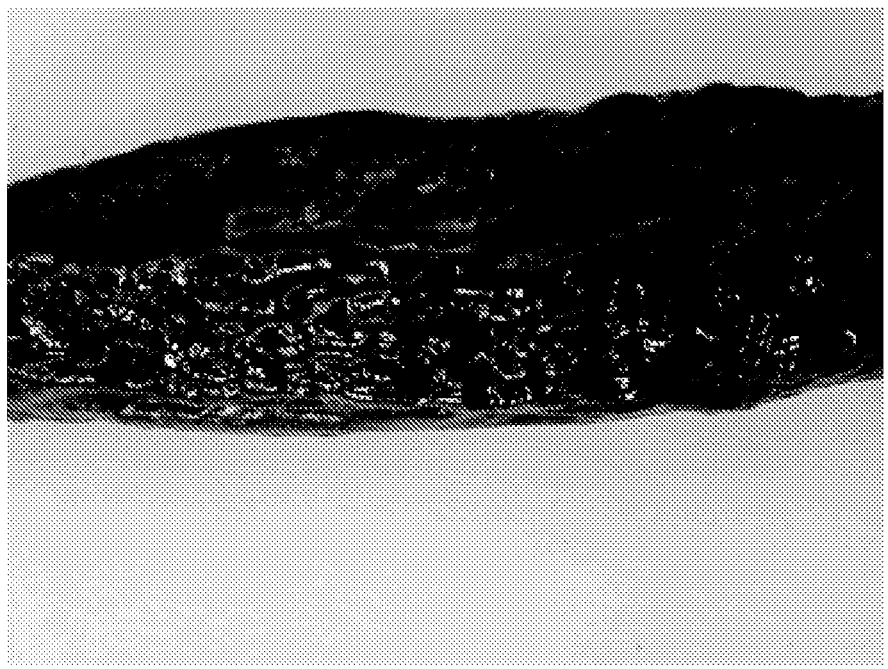
FIG. 9 presents the congealed molten mass of the single-type identified polypropylene plastic, known from the state of the art.

Hardened molten mass of similar appearance, known from the state of the art, obtained from a single-type polymer is presented in FIG. 9 for comparison. In this case the hardened molten mass has been obtained from sorted and washed single-type plastic material, more specifically polypropylene (PP). The quality of fusing is clearly visible, no lumpiness is evident, the mass of plastic has congealed uniformly. Very hard to break by hand.

Figure 6:
FIG. 6 presents a sample product profile obtained from the polymer composition of the present invention presented in FIG. 5.
Figure 10:
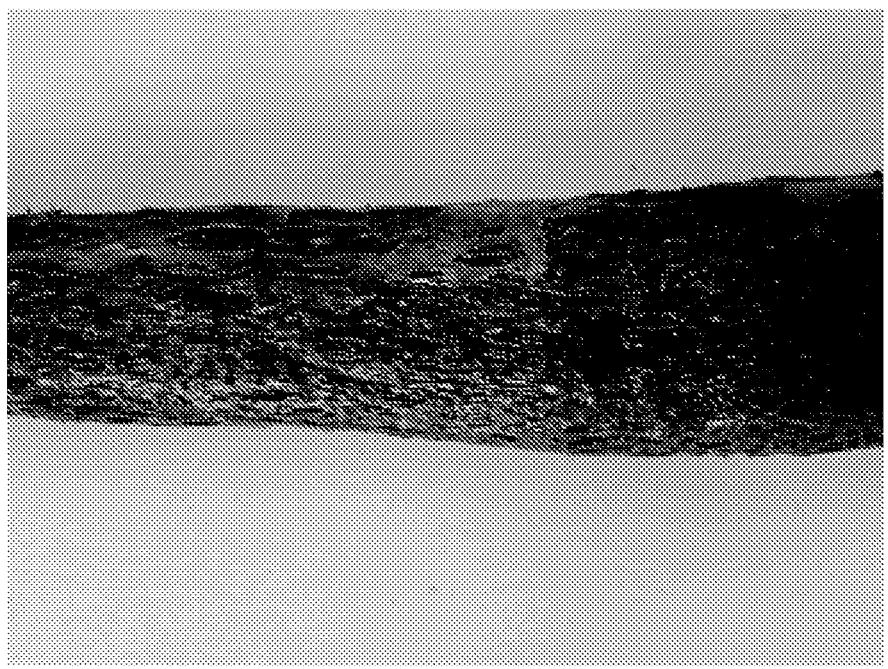
FIG. 10 presents the congealed molten mass of the polymer composition of the present invention presented in FIG. 5.

The test specimen corresponding to mixture C is presented in FIG. 10. The quality of mixture C is primarily assessed visually. The test specimen shown in FIG. 9 has been used as reference. The more uniform the fusing quality, the higher the quality of mixture C, that directly affects the efficiency of the production process, to achieve the product shown in FIG. 6.

Figure 11:
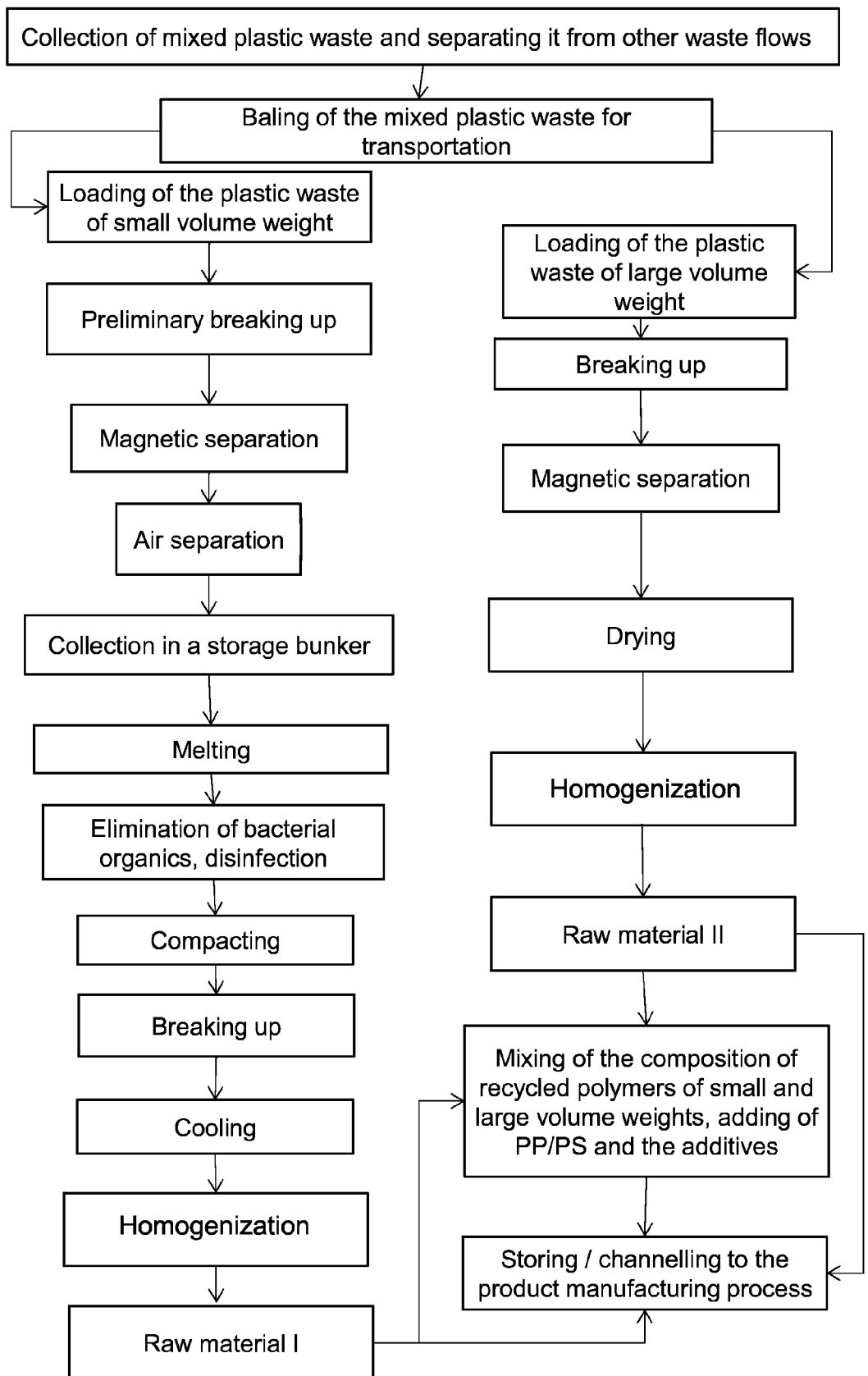
FIG. 11 presents the block diagram of the process for obtaining the polymer composition of the present invention from the mixed plastic waste.

FIG. 11 presents the block diagram of the process for obtaining the polymer composition of the present invention from the mixed plastic waste. The polymer composition of the present invention, obtained from mixed plastic waste comprises a homogeneous polymer mixture recycled from unsorted, unidentified, uncleaned plastic waste of different densities, various colours, small volume weight and large volume weight.

Collected plastic waste of small volume weight, separated from other waste flows, and pressed together, are conveyed to the plastic waste recycling line where preliminary breaking up is performed; after that non-plastic waste is separated (e.g. by way of magnetic and air separation), and the preliminarily broken-up mixture of plastic waste is routed to recycling. The plastic waste is also mixed during the separation. Plastic waste of small volume weight is compacted in the course of recycling as plastics of this type have large cubages and are light volatile. Additional disintegration is performed during the compacting process, accompanied by continuous mixing and heating of the plastic mixture, until melting of the plastic mixture. As the plastics are dirty, other organic or inorganic material, still remaining in the plastic waste after the preceding separation of the non-plastic waste, is also destroyed or melted into uniform mass in the course of the breaking up, mixing and heating process.

The compacting process is completed by quick cooling of the obtained mixture, and subsequent breaking up of the hardened mass to a fraction having a size of approximately 1 to 10 mm, preferably 5.1 to 10 mm. The agglomerate obtained is then routed to homogenisation.

The volume of the plastic mixture is compacted approximately ten times in the course of this process. The mass of plastic waste transformed to the molten state in the course of the compacting process is rapidly cooled. For example cooled water, preferably at the temperature of approximately 4° C. to 10° C., is added to it, resulting in the molten mass hardening within a short space of time.

The blades of the compacting equipment, initially used to break up the plastic mixture and mix the molten mass, start to break up the hardened mass. Breaking up is performed until obtaining an agglomerate of uniform fraction.

The compacting system reduces the cubage of plastic waste, increases their density, mixes the plastic waste in the molten state, destroys the organic and bacterial material, and creates a stable material mixture, with a fraction size of approximately 3 to 10 mm, and moisture content below 1%, suitable for the subsequent production process. For example, a device with its blade system equipped with the drive and power unit sufficient to operate the blade system during the mixing and breaking up various plastic materials, and after that during the breaking up of the mass of hardened plastics, has been used as the compacting system. The blades of the blade system have been designed so as to enable them to break up the plastic waste mixture, mix this mixture in its molten state, and also function as the disintegrating mechanism after cooling the melted mass until its hardening. Further, a heating mechanism is additionally added to the compacting system, if required. As a result of the high temperature created in the course of the compacting system process, the temperature of the agglomerate obtained is approximately 115° C. to 165° C. when conveyed out of the compacting system.

The agglomerate obtained is routed to drying and homogenisation, in the course of which the material mixture is mixed through, and a material of uniform properties is obtained. Unlike the generally known processes that route the compacted clean single-type polymer materials to subsequent regranulate production, according to the present invention the material passes through an additional cooling cycle lasting several hours, during which the material is mixed, and gradually cooled, this way stabilising the properties of the polymers for the subsequent production cycle.

The after-cooler is designed to preserve the plastic properties and fraction of the material. After the after-cooling, the material is conveyed to the homogenisation system where mixing of the material takes place. The homogenisation system comprises a container mixer of at least 28 m³, enabling to mix the materials with each other, and homogenise the raw material mixture by batches of at least 10 to 15 tons. Unlike known container mixers, inflow of warm air has been added to the container mixer of the present solution, to also achieve efficient drying along with the mixing.

Collected plastic waste of large volume weight, separated from other waste flows, and pressed together, is broken up, non-plastic waste is separated from it, it is dried, if necessary, and homogenized. Plastic waste of higher density (from 0.4 tons per m³) is broken up to a fraction of 3 to 10 mm in the course of the production process. The polymer materials are mixed in large quantities starting from 5 tons in the drying mixer tower and homogenisation tower. The homogenisation process unifies the properties of the polymers, and the drying process decreases the moisture content of the materials below 1%. Unlike known container mixers, inflow of warm air has been added to the drying mixer tower to obtain the polymer mixture of the present invention, so efficient drying would also be achieved along with the mixing.

After compacting and homogenisation of the mixed plastic waste of small volume weight, and homogenisation of the plastic waste of large volume weight, mixing of the plastic waste of small volume weight and the plastic waste of large volume weight is performed to obtain the polymer composition of the invention, whereas the percentage of the material mixture produced from the plastic waste of small volume weight is approximately from 50% to 75%, and the percentage of the material mixture produced from the plastic waste of large volume weight is approximately from 25% to 50%.

What is claimed is:

1. A process for obtaining a polymer composition from mixed small volume weight of between 0.1-0.4 ton/m³ and large volume weight of more than 0.4 ton/m³ plastic waste, comprising:
   (a) separating mixed plastic waste from other waste flows;
   (b) baling the mixed plastic waste;
   (c) separating the small volume weight and the large volume weight plastic waste;
   (d) preparing a first raw material from the small volume weight plastic waste by the steps consisting of:
      breaking up the small volume weight plastic waste,
      separating non-plastic waste from the small volume weight plastic waste,
      melting of the small volume weight plastic waste,
      compacting the small volume weight plastic waste,
      breaking up the compacted mass into pieces sized at 3-10 mm to obtain an agglomerate fraction, and
      homogenizing the agglomerate to obtain the first raw material comprising 50-60% of polyethylene (PE) based on its total volume; 20-30% of polypropylene (PP) based on its total volume; 5-10% of polystyrene (PS) based on its total volume; and 1-10% of unidentified plastic and other materials based on its total volume;
   (e) preparing a second raw material from the large volume weight plastic waste by the steps consisting of:
      breaking up the large volume weight plastic waste-into pieces sized between 3 mm and 10 mm,
      separating non-plastic waste from the large volume weight plastic waste,
      drying the large volume weight plastic waste, and
      homogenizing the large volume weight plastic waste to obtain the second raw material comprising PS, LDPE, HDPE, HIPS, ABS, PC, PS/PP compounds; PP/HD compounds and unknown type of plastics;

(f) mixing the first raw material and the second raw material;

(g) adding a mixture comprising of polystyrene (PS), polypropylene (PP) and additive selected from the group comprising of pigments in PE-carrier, UV protective agents, antioxidants, foaming agent, mineral and structure supplementing additives, glass fiber substances, textile fiber substances, mineral additives and any combination thereof; and h) obtaining the polymer composition having density of 979-1026 kg/m$^3$; melt flow index (g/10 min.) of 2-5; melting temperature of 165-180° C.; tensile modulus (elongation 50 mm/min.) of 794.97-864.70 Mpa; tensile stress at maximum load (elongation 50 mm/min) of 18.11-21.04 MPa; impact strength Charpy (Hammer 4 J) of 1348-1938 kJ/m$^2$, and heat deflection temperature of 79-81° C.

2. The process of claim 1, wherein during the drying process of the large volume weight plastic waste in step e) a moisture content of the large volume weight plastic waste is decreased below 1%.

3. The process of claim 1, wherein during the compacting process of volume of the small volume weight plastic waste in step d) the volume of the small volume weight plastic weight is compacted approximately ten times.

4. The process of claim 1, wherein during the compacting process of the small volume weight plastic waste in step d) a moisture content of the material is reduced below 1%.

5. The process of claim 1, wherein the agglomerate fraction obtained in step d) has density of 380-450 kg/m$^3$.

6. The process of claim 1, wherein the compacted small volume weight plastic waste obtained in step d) has density of 950-1050 kg/m$^3$.

7. The process of claim 1, wherein the homogenization in step d) is performed with temperatures 115° C. to 165° C.

8. The process of claim 1, wherein the obtained polymer composition comprises: recycled small volume weight plastic waste, approximately 50-75% of total volume; recycled large volume weight plastic waste, 10-25% of total volume; polystyrene (PS), 5-20% of total volume; polypropylene (PP), 5-20% of total volume; and the additives, 0.2-10% of total volume.

* * * * *